(12) United States Patent
Pawar et al.

(10) Patent No.: US 8,429,098 B1
(45) Date of Patent: Apr. 23, 2013

(54) CLASSIFICATION CONFIDENCE ESTIMATING TOOL

(75) Inventors: Sachin Sharad Pawar, Maharashtra (IN); Girish Joshi, Maharashtra (IN); Santosh Katakol, Mumbai (IN)

(73) Assignee: Global eProcure, Clark, NJ (US)

( * ) Notice: Subject to any disclaimer, the term of this patent is extended or adjusted under 35 U.S.C. 154(b) by 367 days.

(21) Appl. No.: 12/799,725

(22) Filed: Apr. 30, 2010

(51) Int. Cl.
*G06F 15/18* (2006.01)

(52) U.S. Cl.
USPC .................................................. 706/12

(58) Field of Classification Search ............. None
See application file for complete search history.

(56) References Cited

U.S. PATENT DOCUMENTS

| | | | |
|---|---|---|---|
| 6,128,613 A * | 10/2000 | Wong et al. ........... | 707/738 |
| 6,192,360 B1 * | 2/2001 | Dumais et al. .......... | 1/1 |
| 6,920,448 B2 | 7/2005 | Kincaid et al. | |
| 7,251,648 B2 | 7/2007 | Chaudhuri et al. | |
| 7,269,545 B2 | 9/2007 | Agichtein et al. | |
| 7,461,051 B2 | 12/2008 | Lavine | |
| 7,577,651 B2 | 8/2009 | Jones et al. | |
| 7,617,193 B2 | 11/2009 | Bitan et al. | |
| 2003/0191673 A1 | 10/2003 | Cohen | |
| 2005/0210065 A1 | 9/2005 | Nigam et al. | |
| 2006/0195428 A1 | 8/2006 | Peckover | |
| 2007/0143273 A1 | 6/2007 | Knaus et al. | |
| 2007/0282780 A1 | 12/2007 | Regler et al. | |
| 2009/0319521 A1 | 12/2009 | Groeneveld et al. | |

FOREIGN PATENT DOCUMENTS

| | | |
|---|---|---|
| KR | 2008/0031928 A | 4/2008 |
| WO | WO94/23386 A2 | 10/1994 |
| WO | WO98/16890 A1 | 4/1998 |
| WO | WO01/35274 A1 | 5/2001 |
| WO | WO2004/102533 A2 | 11/2004 |
| WO | WO2008/034219 A1 | 3/2008 |

OTHER PUBLICATIONS

Ho et al, Decision Combination in Multiple Classifier Systems, Jan. 1994.*
Jirina et al, Simple and Effective Probability Density Estimation and Classification, Oct. 2006.*
Mori, Information gain ratio as term weight: the case of summarization of IR results, Sep. 2002.*

* cited by examiner

*Primary Examiner* — David Vincent
*Assistant Examiner* — Mikayla Chubb
(74) *Attorney, Agent, or Firm* — Camille L. Urban; G. Brian Pingel; David M. Breiner

(57) ABSTRACT

Disclosed is a tool that assesses and classifies data in a data set to and compares those assessments with nominal attributes and text attributes of data present in a new record to assign a classification to the new record. The classification assigned to the new record is provided a confidence level based on both a qualitative factor and a quantitative factor. The qualitative factor may be calculated by forming of a list of important words for each class and comparing the list to data in the new record and converting the comparison into a confidence level; the quantitative factor may be calculated by estimating the importance or weight of several factors, ratios of certain probabilities related to the most likely class and to the second most likely class, and using the importance of the factors and matchfactors to scale the resulting ratio, then transforming the resulting ratio into a confidence level.

13 Claims, 5 Drawing Sheets

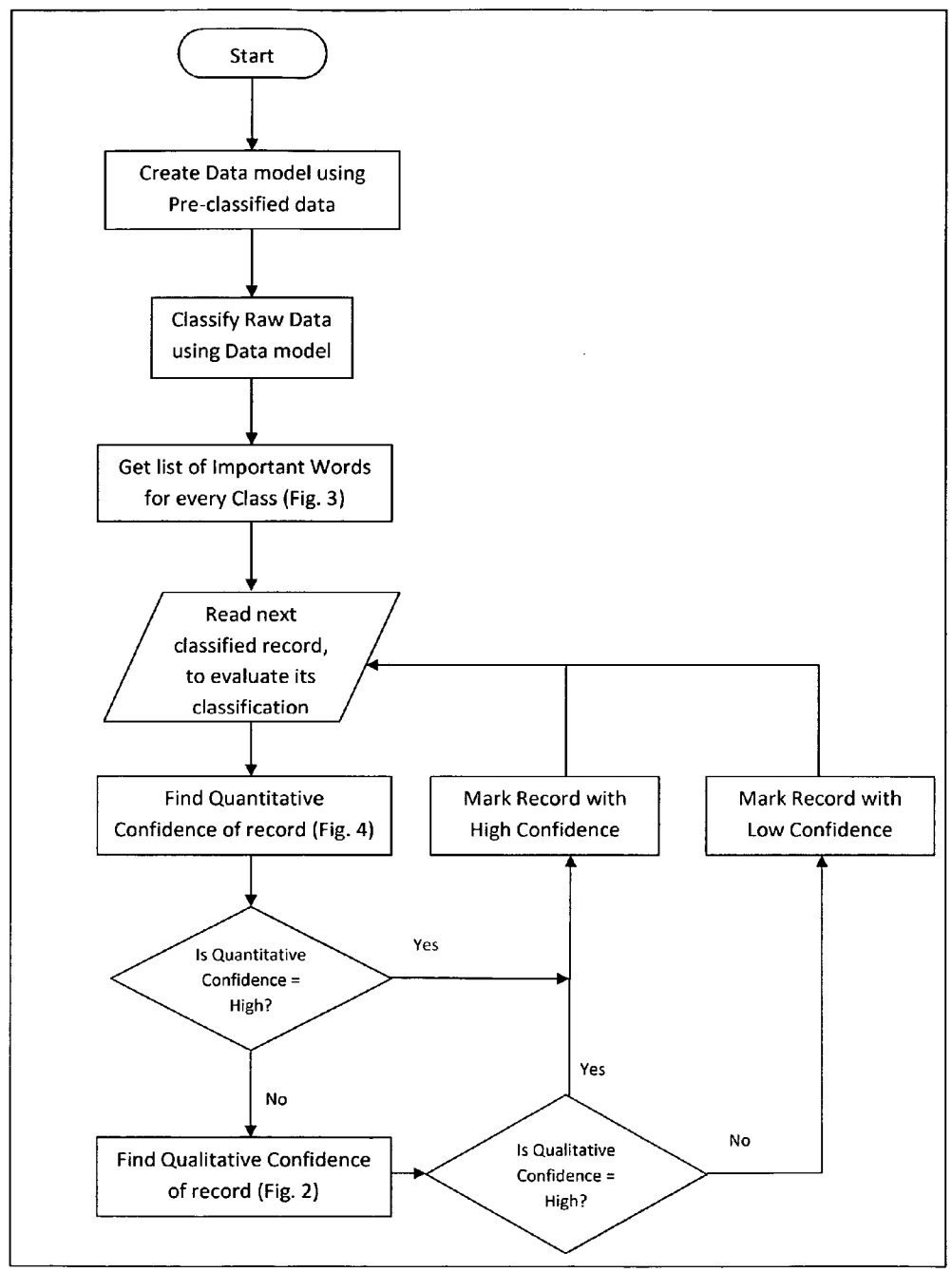
Flowchart: Confidence Allocation for Classified Output (Fig. 1)

Algorithm C: Assign Qualitative Confidence Level to the classified Record (Fig. 2)
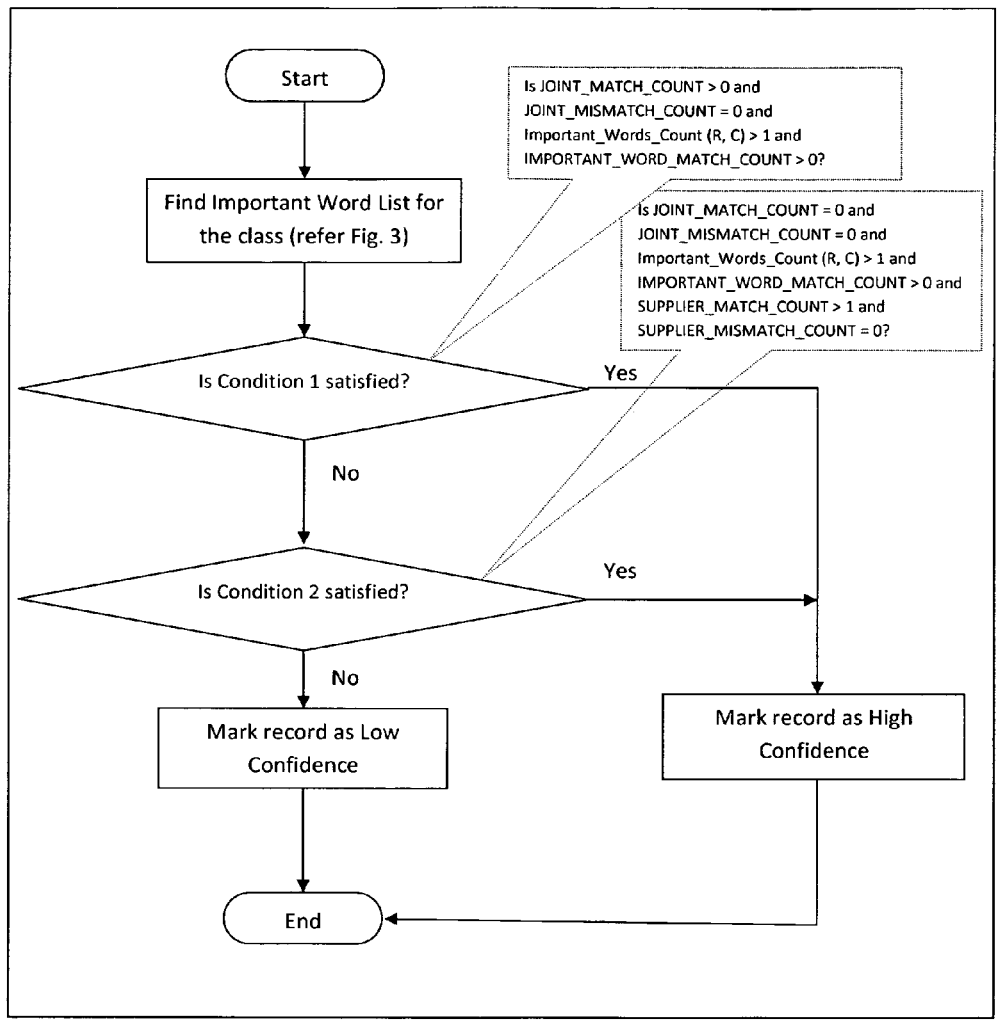

Algorithm A: Find Important Words for every Class / Category (Fig. 3)
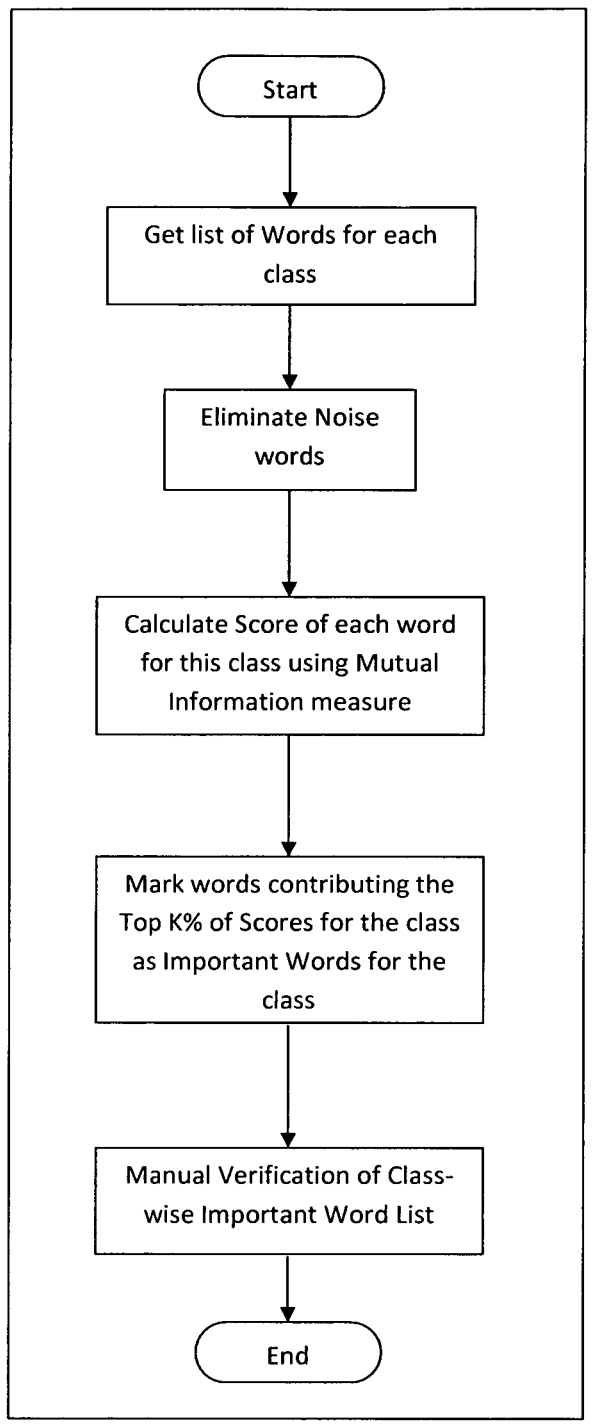

Algorithm B: Assign Quantitative Confidence Level to the classified Record (Fig. 4)
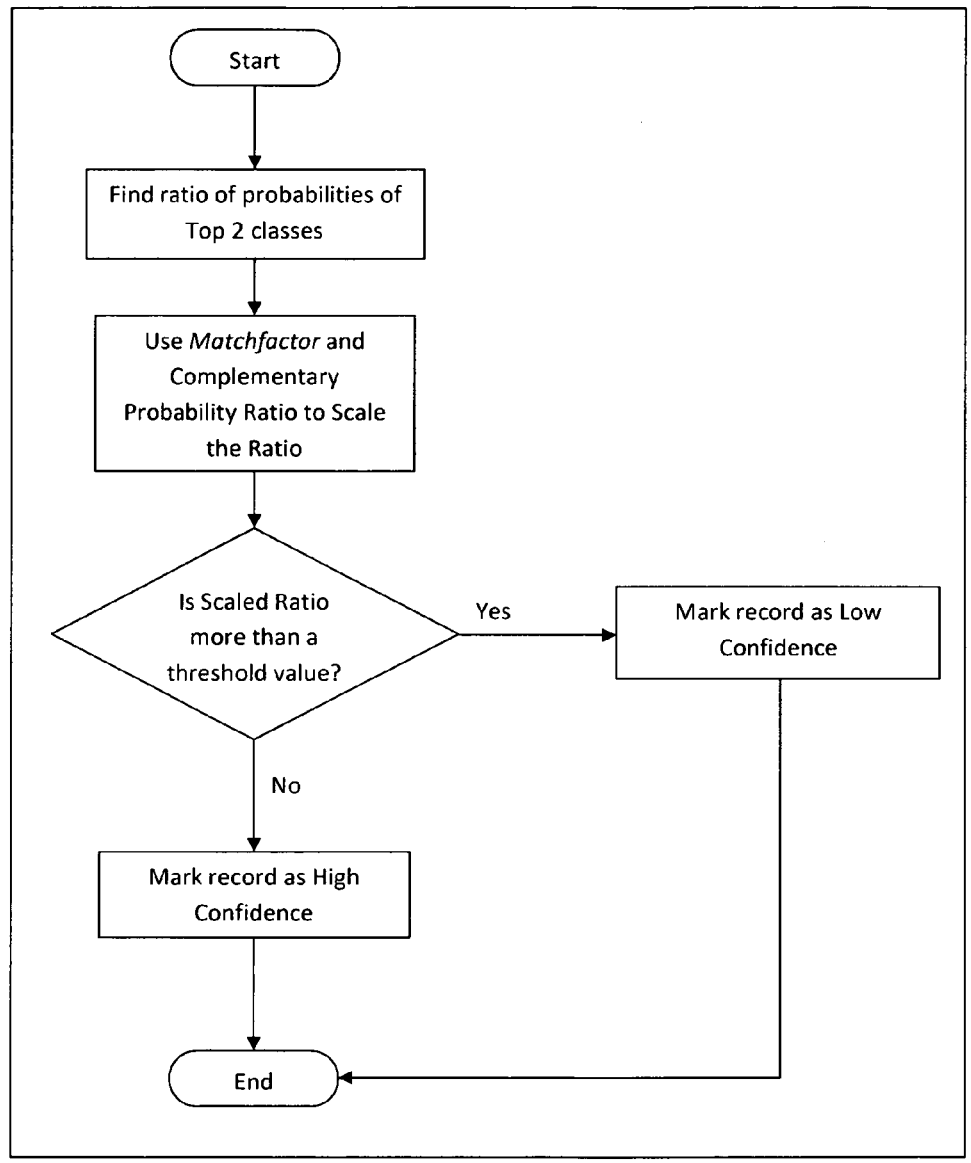

Algorithm D: Learn weights/importance of each factor constituting quantitative confidence factor (Fig. 5)
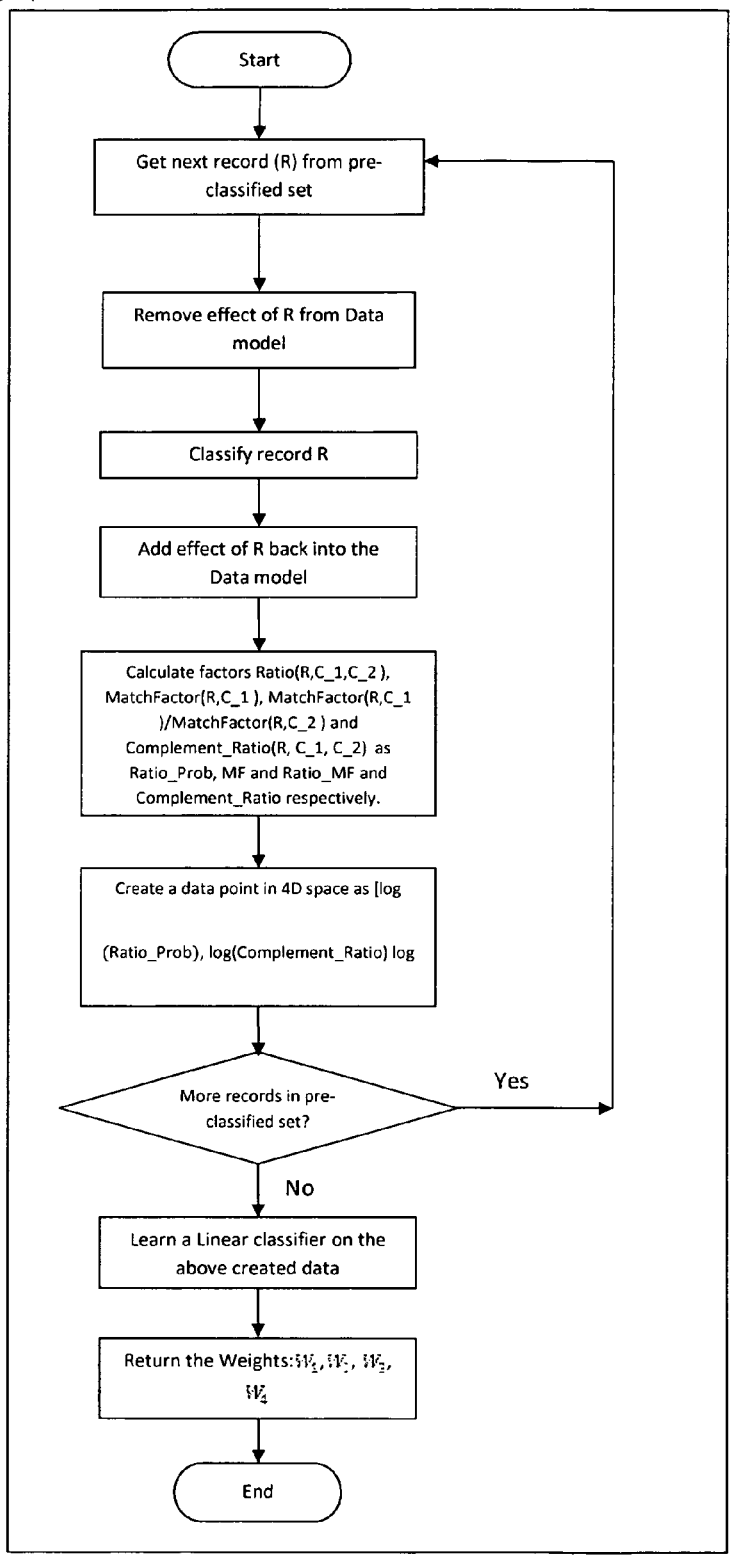

CLASSIFICATION CONFIDENCE ESTIMATING TOOL

BACKGROUND OF THE INVENTION

1. Field of the Invention

The present invention relates to means and methods of accurately classifying a new record and, specifically, the combination of appropriate measures necessary to evaluate the confidence of a classification assignment.

2. Description of the Prior Art

Several inventions have been made that are tangentially related to the present invention. They employ either a quantitative confidence factor or a qualitative confidence factor, often depending upon the type of data to be classified. Specifically, the quantitative factor is the probability that the correct class is indeed the class given by an algorithm. The qualitative factor is a factor that uses evidence from a set of pre-classified data to determine that the classification assigned is indeed correct, but does not employ a probability measure.

For example, U.S. Pat. No. 6,421,640 discloses a method employed for speech recognition. This method combines a linear plurality of secondary confidence measures to arrive at a primary confidence measure. By minimizing cross-entropy measures, the methods learn the parameters of the secondary confidence measures.

U.S. Pat. No. 5,251,131 discloses a method to find confidence employing a KNN classifier to provide a distance measure. Then, the ratio of the best distance measure to the sum of the distance scores of the top two classes is the confidence measure.

U.S. Pat. No. 6,192,360 employs the Mutual Information (MI) criteria for feature selection.

Each of the aforementioned approaches either looked at text attributes or considered nominal attributes of a record, but not both. In a scenario where the record to be classified is a record containing both types of attributes, looking at only one and simply ignoring the other necessarily reduces the possible accuracy of any classification tool. However, if a classification method could employ measurements for assigning and assessing the confidence of a classification that considered both the text attributes and the nominal attributes of the subject record in a meaningful way, then that method's ability to estimate the confidence of the classification of the subject record would be greater.

What was needed was a way to provide confidence estimation of a classification assignment that takes into account both text attributes and nominal attributes.

SUMMARY OF THE INVENTION

Where each in a set of records needs to be assigned a class, the present invention comprises a tool that first creates a Data Model from a set of pre-classified records. First this Data Model and then the attributes of the new record to be classified are subjected to a set of measurements which result in assigning a classification to the new record. Then, the confidence of the classification assigned is determined. The tool of the present invention employs both a qualitative confidence factor and a quantitative confidence factor to assess the confidence of the assigned class. The measurements used to assign the class address both text attributes and nominal attributes of the record set.

The tool uses joint distribution of some or all nominal attributes and only some important words of text attributes to determine if there is evidence for a given classification for the subject record. If there is evidence for classification, the record is marked "high confidence".

Providing more detail, the qualitative factor comprises looking at the mixed set of attributes using feature selection methods. Records are identified as high confidence if they follow certain conditions on the Joint Distribution of Attributes. If the conditions are satisfied then that is considered an indication that there is enough evidence for accurate classification. To reduce the feature space, Mutual Information is used to score each word for each class. Mutual Information between a word and a class measures mutual dependence between the two; noise and variation in text are accounted for. Based on these Mutual Information scores of the words, a set of words important for each class is determined.

The qualitative factor seeks evidence for classification using joint distribution of some or all nominal attributes and only some important words of text attributes. If it finds such evidence, the classification is considered to be good and is marked with High Confidence. If it does not, the classification is marked as low confidence.

The quantitative factor includes four sub-factors. A classic ratio of probabilities of the two most likely classifications is the first of four. However, since a pre-classified set of records is often skewed (i.e. some classes include many records in the set, others only a few) the Ratio of Complement probabilities of top 2 classes is also considered in order to remove the effect of the skew; this is the second factor. The quantitative factor also employs a measure called Matchfactor. Matchfactor is defined for a record/class pair and it is the fraction of the attributes in the new record having a match in the pre-classified set for that particular class and is the third factor. The Matchfactor of the most probable class is determined for the record to be classified. Also, the ratio of the Matchfactor of the most likely class to the Matchfactor of the second most likely class is used to determine confidence; the fourth factor.

Once these four factors are determined for each record in the pre-classified set using the leave-one-out method, the dataset containing the four factors for each record and a label indicating whether the record is classified correctly or not is created. A support vector machine or any other linear classifier can be trained on this data to learn the required weights for the four factors. Once determined, the weights of the four factors are used to assess the quantitative confidence level of the new record's classification.

The qualitative and quantitative approaches are combined to give a consolidated list of records classified with high-confidence.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 1 is a flow chart describing the steps necessary for determining confidence of classification using both qualitative and quantitative confidence measures;

FIG. 2 is a flow chart providing specifics for assigning Qualitative Confidence Level to the classified Record;

FIG. 3 provides detail of the process of finding important words for each class as needed to assign the Qualitative Confidence Level;

FIG. 4 is a flow chart providing specifics for assigning Quantitative Confidence Level to the classified Record;

FIG. 5 provides detail of the process of learning weights for each factor used to determine the Quantitative Confidence Factor.

DESCRIPTION OF THE PREFERRED EMBODIMENTS

In one of the preferred embodiments, a Data Model is created based on pre-classified records. Then, the new record is subjected to a classification process employing some probabilistic classification algorithm. Once classified, the level of confidence of that designation is determined based on qualitative factors and on quantitative factors.

Although it is not necessary to perform the following activities exactly in a specific order, FIG. 1 provides an overview of one way of accomplishing the objectives of the invention. As shown in the FIG. 1, it is convenient to begin by creating the Data Model. Next, determine the List of Important words for each class which will be used for the qualitative factor (see FIG. 3). Then, estimate the weights of each of the four factors which will contribute to the quantitative factor (see FIG. 5). Once this information is in hand, then the quantitative confidence level and the qualitative confidence level of the classification assigned to a new record based on the Data Model can be determined.

Referring again to FIG. 1, the present invention suggests determining the quantitative confidence level first (see FIG. 4), and if high confidence is indicated, marking the classified record as such. If high confidence is not indicated, then the qualitative confidence level should be determined (see FIG. 2). If high confidence is indicated by the qualitative confidence level, then the record should be so marked. If high confidence is not indicated by the qualitative confidence level and by the quantitative confidence level, then the record is marked as low confidence. The output of this approach generates a confidence level measurement for the classification assigned to each new classified record.

Now in more detail, the following embodiment is presented. However, it should be known that the details of this embodiment are provided by way of example, and not as limitations. There are often several ways to accomplish each of the different tasks necessary to provide a qualitative factor or a quantitative factor and the described embodiment is not meant, nor should it be interpreted, to restrict the invention to any one specific combination of these tasks.

In order for the preferred embodiment to be best understood, the meaning of certain notations employed in the description of the embodiment will be necessary. The following notations appearing in equations and algorithms herein will have the following meaning:

$A=\{A_i: i=1 \text{ to } N\}$: Indicates N nominal attributes in the data.

R: means a record to be classified; it includes both nominal and text attributes, along with their corresponding values.

$R_{Train}$ means a classified record in the Pre-classified set.

$R^{Nom}=R(A_1=v_1, A_2=v_2, \ldots, A_N=v_N)$: Indicates the values taken by the nominal attributes for a record R to be classified.

Important_Words(C): Indicates Set of all Important Words for Class C.

Important_Words_Record(R, C): Indicates Set of all Important Words in record R which is classified with class C.

Important_Words_Count(R, C): Indicates count of Important Words in record R which is classified with class C.

Classification(R): Indicates the class assigned by Classifier to record R.

Count(X): Is count of Records, which Satisfy Condition X (i.e. for which X is true).

Contains(R, Word Set): is true if, record R contains every word in the Word Set; false otherwise.

Count(Contains($R_{Train}$, Important_Words_Record(R, C)) & $R^{Nom}=R_{Train}^{Nom}$ & Classification(R)=C & Classification($R_{Train}$)=C): or JOINT_MATCH_COUNT as used in the description of the preferred embodiment: Means the count of records in the pre-classified set, having all the important words of R, having same values of the nominal attributes as that of R; and both $R_{Train}$ and R are classified in class C.

Count(Contains($R_{Train}$, Important_Words_Record(R, C)) & $R^{Nom}=R_{Train}^{Nom}$ & Classification(R)=C & Classification($R_{Train}$)!=C): or JOINT_MISMATCH_COUNT as used in the description of the preferred embodiment: Means the count of records in the pre-classified set, having all the important words of R, having the same values of the nominal attributes as that of R; and R is classified in class C however $R_{Train}$ is classified with some class other than C.

Count (Classification(R)=C & Classification ($R_{Train}$)=C & Important_Words_Record (R, C)=Important_Words_Record ($R_{Train}$, C)): or IMPORTANT_WORD_MATCH_COUNT as used in the description of the preferred embodiment: Is Count of records from the Pre-classified set, such that both the record R and $R_{Train}$ are classified in the same class and both of them have exactly the same Important Word Set.

Count(Contains($R_{Train}$, Important_Words_Record (R, C)) & $R^{Nom(Supplier\_Name)}=R_{Train}^{Nom(Supplier\_Name)}$ & Classification(R)=C & Classification($R_{Train}$)=C): or SUPPLIER_MATCH_COUNT as used in the description of the preferred embodiment: Is count of records in the pre-classified set, having all the important words of R, having the same value of the Supplier Name as that of R; and both $R_{Train}$ and R are classified in class C.

Count(Contains($R_{Train}$, Important_Words_Record (R, C)) & $R^{Nom(Supplier\_Name)}=R_{Train}^{Nom(Supplier\_Name)}$ & Classification(R)=C & Classification($R_{Train}$)!=C): or SUPPLIER_MISMATCH_COUNT as used in the description of the preferred embodiment: Is count of records in the pre-classified set, having all the important words of R, having the same value of the Supplier Name as that of R; and R is classified in class C however $R_{Train}$ is classified with some class other than C.

$P_i$: means the $i^{th}$ best Posterior probability of the record R (record R is classified by a probabilistic classifier)

$cp_i$: means the complement Posterior probability of the record R for $i^{th}$ best class.

Information Gain (A): Indicates the importance of attribute A for classification. It is calculated as the difference between the overall entropy and the conditional entropy of attribute A.

MatchFactor (R, C): Matchfactor of record R with the class C is defined as the ratio of the number of attributes for which R has a match in the pre-classified set for class C to the total number of attributes in the pre-classified set. Importance of attributes in terms of their Information Gain is considered while calculating the ratio. A nominal attribute A in record R, is said to have a match in the pre-classified set with class C, if value of attribute A in R has occurred with class C at least once in the pre-classified set. For the text attribute, match is considered even if at least one word has occurred in the pre-classified set with corresponding class.

MatchFactor (R, C)=(Sum of Information Gains of attributes for which R has a match for class C in pre-classified set)/(Sum of Information Gains for all attributes)

In the preferred embodiment, using the notations and definitions presented herein, the list of important words for each class is derived by performing the following tasks:

Input: Pre-Classified Data Set (Attributes and its classification)
Output: Class wise Important Word List of the Record
1. For each class do the following:
   a. Find list of words belonging to the class. This list is filtered so as to eliminate some of the commonly occurring words (or noise words). (The set of noise words will differ for various classification tasks.)
   b. For each word in the filtered list, find the Mutual Information Score for the (Class, Word) pair, using the following:

$$\text{Score}(C_i, W_j) = P(C = C_i, W = W_j) * \log\left(\frac{P(C = C_i, W = W_j)}{P(C = C_i)P(W = W_j)}\right) +$$
$$P(C! = C_i, W = W_j) * \log\left(\frac{P(C! = C_i, W = W_j)}{P(C! = C_i)P(W = W_j)}\right)$$

The probability values can be estimated based on Maximum Likelihood Estimation and using pre-classified data set.
   c. The words which lie in the Top K %, when arranged as per their Mutual Information Score are considered as Important Words for the class. Typically value of K could be 80-90%.
   d. Optional Word Verification Stage by Domain Expert. If Domain Expert is available, he goes through the list of important words of each Category, and modifies it so that it does not have some words which shouldn't have been there and it adds the words missing from it. This ensures that the Category-wise List does not have some obvious mistakes.

To determine the importance weight for each factor used to determine the quantitative confidence factor, the following approach can be employed:

Input: Pre-Classified Data Set
Output: Weights $W_1$, $W_2$, $W_3$ and $W_4$ in the following formula, $$\text{ScaledRatio}(R, C_1, C_2) =$$
$$\{\text{Ratio}(R, C_1, C_2)\}^{W_1} * \{\text{Complement\_Ratio}(R, C_1, C_2)\}^{W_2} *$$
$$\{\text{MatchFactor}(R, C_1)\}^{W_3} * \left\{\frac{\text{MatchFactor}(R, C_1)}{\text{MatchFactor}(R, C_2)}\right\}^{W_4}$$

1. For each record R in the pre-classified set:
   a. Remove the effect of R from the trained model.
   b. Classify record R and check whether classification is correct or not.
   c. Calculate factors Ratio $(R, C_1, C_2)$, Complement_Ratio $(R, C_1, C_2)$, MatchFactor$(R, C_1)$ and $$\frac{\text{MatchFactor}(R, C_1)}{\text{MatchFactor}(R, C_2)}$$

as Ratio_Prob, Complement_Ratio, MF and Ratio_MF respectively.
   d. Create a data point in 4D space as (log Ratio_Prob, log Complement_Ratio, log MF, log Ratio_MF).
   e. Indicate it as a positive data point if classification is correct and negative if classification is incorrect.
2. Learn a linear classifier such as SVM (Support Vector Machine) to classify positive and negative data points created in the above step.
3. Linear classifier takes the form of: $W_1X_1+W_2X_2+W_3X_3+W_4X_4+\text{constant}=0$ where $X_1$, $X_2$, $X_3$ and $X_4$ indicate the point in the 4D space of (log Ratio_Prob, log Complement_Ratio, log MF, log Ratio_MP) mentioned in step 1.
4. We have, $W_1*\log \text{Ratio\_Prob}+W_2*\log \text{Complement\_Ratio}+W_3*\log \text{MF}+W_4*\log \text{Ratio\_MF}$ which implies $\{\text{Ratio\_Prob}\}^{W_1}*\{\text{Complement\_Ratio}\}^{W_2}*\{\text{MF}\}^{W_3}*\{\text{Ratio\_MF}\}^{W_4}$ With these pre-calculations already performed, the invention then obtains a classification of the new record, preferably using some probabilistic classification algorithm. This classification is then evaluated for quantitative confidence level as follows:

Input: Classified Record R (along with Attribute values), its classification C, posterior probability distribution over all the possible classes.
Output: Quantitative Confidence Level of the Record
1. Find the ratio of the probability of most likely class to the probability of second most likely class:

$$\text{Ratio}(R, C_1, C_2) = \frac{p_1}{p_2}$$

where $C_1$ is the most likely class and $C_2$ is the second most likely class
2. Find the ratio of the complement probability of second most likely class to the complement probability of most likely class:

$$\text{Complement\_Ratio}(R, C_1, C_2) = \frac{cp_2}{cp_1}$$

where $C_1$ is the most likely class and $C_2$ is the second most likely class
3. Scale this ratio using Matchfactors of the top 2 classes as:

$$\text{ScaledRatio}(R, C_1, C_2) =$$
$$\{\text{Ratio}(R, C_1, C_2)\}^{W_1} * \{\text{Complement\_Ratio}(R, C_1, C_2)\}^{W_2} *$$
$$\{\text{MatchFactor}(R, C_1)\}^{W_3} * \left\{\frac{\text{MatchFactor}(R, C_1)}{\text{MatchFactor}(R, C_2)}\right\}^{W_4}$$

4. Transform this Scaled Ratio $[0, \infty]$ using a sigmoid function to lie in the range $[0.5, 1]$. Then transform it linearly in the range $[0, 1]$ to get the reliability value.
5. If the reliability value is above certain pre-determined threshold value, then the classification is marked as High Confidence; else it is marked as Low Confidence.

If the quantitative confidence level is not above the pre-determined threshold value, then the qualitative confidence level should be determined. One way of obtaining the qualitative confidence level for the classification of a record is as follows:

Input: Classified Record R (along with Attribute values), its classification C, Important Word List belonging to the class of the record
Output: Qualitative Confidence Level of the Record
1. Find the set of important words, for the record, using the Important Word List for the class
2. Find out if the following properties are satisfied for the classified record:
   a. JOINT_MATCH_COUNT>0
   b. JOINT_MISMATCH_COUNT=0
   c. Important_Words_Count (R, C)>1
   d. IMPORTANT_WORD_MATCH_COUNT>0
If all the conditions are satisfied, mark the record with High Confidence.
3. Otherwise check if certain application specific properties are satisfied for the classified record. For example, in analyzing records related to spend data in a supplier/purchaser environment, the following properties may be important:
   a. JOINT_MATCH_COUNT=0
   b. JOINT_MISMATCH_COUNT=0
   c. Important_Words_Count (R, C)>1
   d. IMPORTANT_WORD_MATCH_COUNT>0
   e. SUPPLIER_MATCH_COUNT>1
   f. SUPPLIER_MISMATCH_COUNT=0
These conditions are very specific to the Spend classification problem; however, other classification problems will have conditions specific to the subject matter and which can be applied. The basic intent of this step is to check whether a similar record and classification exists in the pre-classified set. If all the conditions are satisfied, this indicates that a similar record and classification does exist in the pre-classified set and the record is marked as High Confidence.
4. If none of these conditions are satisfied, mark the record as Low Confidence.

These assessments for each new record provide a confidence level of the classification assigned to the record. This confidence level takes into account both qualitative and quantitative factors and considers both text and nominal attributes when necessary to ascertain a final determination of confidence. The invention combines the power of quantitative and qualitative factors to provide a more robust evaluation of the confidence level of the classification rather than relying on a portion of the attributes of a record and ignoring the others.

Thus, the present invention has been described in an illustrative manner. It is to be understood that the terminology that has been used is intended to be in the nature of words of description rather than of limitation.

Many modifications and variations of the present invention are possible in light of the above teachings. For example, it is possible to use a number of different approaches to assigning a class to the new record. There are several ways to evaluate which words are important to a class. More than one approach can be used to determine the weight of certain factors. And, therefore, within the scope of the appended claims, the present invention may be practiced otherwise than as specifically described.

We claim:

1. A non-transitory computer readable medium for estimating a confidence level of a classification assignment, the non-transitory computer readable medium having instructions configured to cause a processor of a computer to:
   create a data model having a plurality of classes of records, the data model being based on a set of pre-classified records;
   assign one of said classes to a new record;
   obtain a qualitative confidence level for the assignment of said class;
   obtain a quantitative confidence level for the assignment of said class; and
   combine the qualitative confidence level and the quantitative confidence level, wherein the quantitative confidence level is obtained by finding a ratio of the probability of said class to a second most likely class, finding a ratio of a complement probability of said second most likely class to a complement probability of said class, and using matchfactors to generate a scaled ratio.

2. The non-transitory computer readable medium claimed in claim 1 wherein the non-transitory computer readable medium is configured to devise from said data model a list of important words for each class to obtain the qualitative confidence level.

3. The non-transitory computer readable medium claimed in claim 1 wherein the non-transitory computer readable medium is configured to estimate weights for each of a plurality of factors effecting said quantitative confidence level to obtain the quantitative confidence level.

4. The non-transitory computer readable medium claimed in claim 1 wherein the non-transitory computer readable medium is configured to devise a list of important words for each of said plurality of classes, selecting a set of at least one condition evidentiary of said class, and determining if new record meets said set of at least one conditions.

5. The non-transitory computer readable medium claimed in claim 1 wherein the non-transitory computer readable medium is configured to transform said scaled ratio to a reliability value and comparing said reliability value with a pre-determined threshold for confidence level to obtain the quantitative confidence level.

6. The non-transitory computer readable medium claimed in claim 4 wherein the non-transitory computer readable medium is configured to determine a mutual information score for each possible combination of one of a list of words and one of said plurality of classes to devise the list of important words for each of said plurality of classes.

7. A non-transitory computer readable medium for estimating a confidence level of a classification assignment, the non-transitory computer readable medium comprising a set of instructions stored on a computer readable medium which, when read by a processor, cause a computer to:
   create a data model having a plurality of classes of records, the data model being based on a set of pre-classified records,
   assign one of said classes to a new record,
   obtain a qualitative confidence level for the assignment of said class,
   obtain a quantitative confidence level for the assignment of said class, and
   combine the qualitative confidence level and the quantitative confidence, wherein the non-transitory computer readable medium is configured to estimate a weight for each of a plurality of factors affecting said quantitative confidence level, find a ratio of the probability of said class to the probability of second most likely class, find a ratio of a complement probability of said second most likely class to a complement probability of said class, and use matchfactors to generate a scaled ratio.

8. The non-transitory computer readable medium as claimed in claim 7, wherein the non-transitory computer readable medium is configured to generate a qualitative confidence level and evaluate the qualitative confidence level.

9. The non-transitory computer readable medium as claimed in claim 8 wherein the non-transitory computer readable medium is further configured to devise from said data model a list of important words for each class including listing words belonging to the class and determine a mutual information score for each possible combination of one of the list of words and one of said plurality of classes, select a set of at least one condition evidentiary of said class, and determine if new record meets said set of at least one conditions to generate the qualitative confidence level.

10. The non-transitory computer readable medium as claimed in claim 7 wherein the non-transitory computer readable medium is further configured to devise from said data model a list of important words for each class including listing words belonging to the class and determine a mutual information score for each possible combination of one of the list of words and one of said plurality of classes, select a set of at least one condition evidentiary of said class, and determine if said new record meets said set of at least one conditions to generate the qualitative confidence level.

11. A non-transitory computer readable medium for estimating the confidence level of a classification assignment comprising, the non-transitory computer readable medium including instructions configured to cause a processor of a computer to:
   a) create a data model from a set of pre-classified records, the data model having a plurality of classes of records;
   b) assign one of said classes to a new record;
   c) obtain a qualitative confidence level for the assignment of said class comprising finding a list of words belonging to the class; filtering said list to eliminate any noise words, and for each word on said list, finding a Mutual Information Score for each possible combination of one of the list of words and one of said plurality of classes using the following:

$$\text{Score}(C_i, W_j) = P(C = C_i, W = W_j) * \log\left(\frac{P(C = C_i, W = W_j)}{P(C = C_i)P(W = W_j)}\right) +$$
$$P(C \mathrel{!=} C_i, W = W_j) * \log\left(\frac{P(C \mathrel{!=} C_i, W = W_j)}{P(C \mathrel{!=} C_i)P(W = W_j)}\right)$$

d) obtain a quantitative confidence level for the assignment of said class; and
   e) combine the qualitative confidence level and the quantitative confidence level.

12. A non-transitory computer readable medium for estimating the confidence level of a classification assignment comprising, the non-transitory computer readable medium being configured to cause a processor of a computer to:
   a) create a data model from a set of pre-classified, the data model having a plurality of classes of records;
   b) assign one of said classes to a new record;
   c) obtain a qualitative confidence level for the assignment of said class comprising finding a list of words belonging to the class;
   d) filter said list to eliminate any noise words, and for each word on said list, find a Mutual Information Score for each possible combination of one of the list of words and one of said plurality of classes;
   e) obtain a quantitative confidence level for the assignment of said class using the following; determining a ratio of probabilities of a most likely class to a second most likely class:

$$\text{Ratio}(R, C_1, C_2) = \frac{p_1}{p_2}$$

where $C_1$ is the most likely class and $C_2$ is the second most likely class
   f) determine a ratio of a complement probability of said second most likely class to a complement probability of said most likely class:

$$\text{Complement\_Ratio}(R, C_1, C_2) = \frac{cp_2}{cp_1}$$

where $C_1$ is the most likely class and $C_2$ is the second most likely class
   g) create a scaled ratio of complement probability using a matchfactor of the most likely class and a matchfactor of the second most likely class:

$$\text{ScaledRatio}(R, C_1, C_2) =$$
$$\{\text{Ratio}(R, C_1, C_2)\}^{W_1} * \{\text{Complement\_Ratio}(R, C_1, C_2)\}^{W_2} *$$
$$\{\text{MatchFactor}(R, C_1)\}^{W_3} * \left\{\frac{\text{MatchFactor}(R, C_1)}{\text{MatchFactor}(R, C_2)}\right\}^{W_4}$$

and
   h) combine the qualitative confidence level and the quantitative confidence level.

13. A non-transitory computer readable medium for estimating the confidence level of a classification assignment comprising, the non-transitory computer readable medium being configured to cause a processor of a computer to:
   a) create a data model from a set of pre-classified records, the data model having a plurality of classes of records;
   b) assign one of said classes to a new record;
   c) obtain a qualitative confidence level for the assignment of said class comprising finding a list of words belonging to the class;
   d) filter said list to eliminate any noise words, and for each word on said list, find a Mutual Information Score for each possible combination of one of the list of words and one of said plurality of classes using the following:

$$\text{Score}(C_i, W_j) = P(C = C_i, W = W_j) * \log\left(\frac{P(C = C_i, W = W_j)}{P(C = C_i)P(W = W_j)}\right) +$$
$$P(C \mathrel{!=} C_i, W = W_j) * \log\left(\frac{P(C \mathrel{!=} C_i, W = W_j)}{P(C \mathrel{!=} C_i)P(W = W_j)}\right)$$

e) obtain a quantitative confidence level for the assignment of said class using the following; determining a ratio of probabilities of a most likely class to a second most likely class:

$$\text{Ratio}(R, C_1, C_2) = \frac{p_1}{p_2}$$

where $C_1$ is the most likely class and $C_2$ is the second most likely class
   f) determine a ratio of a complement probability of said second most likely class to a complement probability of said most likely class:

$$\text{Complement\_Ratio}(R, C_1, C_2) = \frac{cp_2}{cp_1}$$

where $C_1$ is the most likely class and $C_2$ is the second most likely class g) create a scaled ratio of complement probability using a matchfactor of the most likely class and a matchfactor of the second most likely class:

$$\text{ScaledRatio}(R, C_1, C_2) =$$
$$\{\text{Ratio}(R, C_1, C_2)\}^{W_1} * \{\text{Complement\_Ratio}(R, C_1, C_2)\}^{W_2} *$$
$$\{\text{MatchFactor}(R, C_1)\}^{W_3} * \left\{\frac{\text{MatchFactor}(R, C_1)}{\text{MatchFactor}(R, C_2)}\right\}^{W_4}$$

and h) combine the qualitative confidence level and the quantitative confidence level.

\* \* \* \* \*